United States Patent Office 2,899,240
Patented Aug. 11, 1959

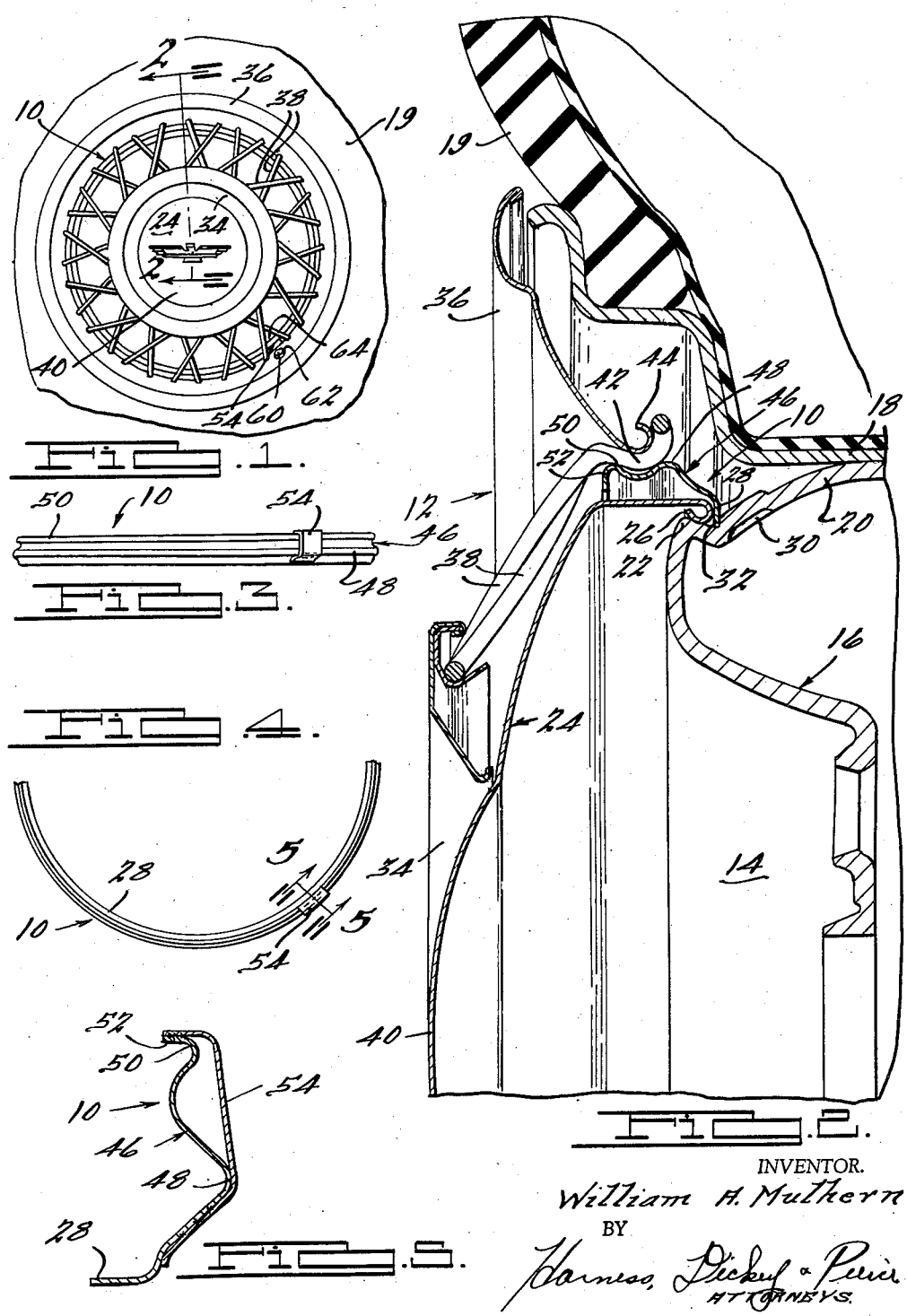

2,899,240

WHEEL TRIM ATTACHMENT

William A. Mulhern, Detroit, Mich., assignor to Gar Wood Industries, Inc., Wayne, Mich., a corporation of Michigan Application June 10, 1957, Serial No. 664,541

4 Claims. (Cl. 301—37)

The present invention pertains to an improved trim assembly for automobile wheels, and more particularly but not necessarily exclusively to improved attaching means for removably attaching a multi-piece trim assembly to the face of an automobile wheel.

One important object of the present invention is to provide improved wheel trim attaching means for removably securing wheel trim members or assemblies to automobile wheels.

Another object is to provide improved attaching means for removably securing a wire wheel simulating trim assembly to the face of an automobile wheel and for holding the trim assembly against rotation upon the wheel about the wheel axis.

Another object is to provide an improved attaching ring which may be wedged against an automobile wheel by the hub cap normally supplied therewith, and which includes a snap spring portion axially outspaced from the wheel for retainingly engaging a trim assembly.

Another object is to provide an improved attaching ring which may be secured to an automobile wheel by engagement with the hub cap normally supplied with the wheel, and which includes a snap spring arrangement cooperable with a wheel trim assembly for holding the wheel trim assembly securely in position on the face of the wheel in spaced relationship thereto, and which also includes means for restraining the trim assembly against indexing, that is, against rotation upon the wheel about the wheel axis.

Still another object is to provide an improved wheel and trim assembly including a wheel having a central body portion provided with an outwardly convexly curved flange and hub cap retaining protuberances, or bumps projecting radially outwardly along the outer edge of said flange, a hub cap having an annular bead at its outer edge for snap spring engagement over the protuberances or bumps, a retaining ring wedged between the hub cap and the wheel flange by the snap spring pressure of the hub cap, the ring also including an axially extending flange portion having an annular groove for snap spring retention of a decorative trim assembly, and a trim assembly supported on said retaining ring in spaced, floating relationship to the wheel.

The foregoing and other objects are achieved by the present invention, one embodiment of which comprises a retaining ring for holding a wire wheel simulating trim assembly on the face of an automobile wheel. The ring has a radially inwardly extending annular flange portion adapted to be seated behind and tightly wedged against the wheel by the hub cap normally supplied with the wheel. The ring also includes an axially extending flange portion arranged for snap spring engagement with the trim assembly. Means are provided on the ring to engage the trim assembly to prevent indexing of the trim assembly upon the wheel and to hold the trim assembly in a predetermined alignment with respect to the wheel. The entire assembly may be readily and simply attached to the wheel, and may be relatively easily removed therefrom for servicing, yet in operation of the wheel, the trim assembly is firmly and securely retained on the wheel. In its preferred form the arrangement is such that the trim assembly is held spaced apart a slight distance from the wheel in "floating" relationship thereto, thus providing for quiet operation and minimizing rattles and squeaks that might otherwise develop.

The invention will now be described in greater detail in connection with the accompanying drawing of which:

Figure 1 is a front elevational view of a wheel assembly according to the invention including a wire wheel simulating trim assembly attached to the wheel according to the invention;

Fig. 2 is a fragmentary, cross-sectional view of the wheel assembly shown in Fig. 1 taken generally along the section line 2—2 thereof;

Fig. 3 is a plan view of an attaching ring according to the invention for attaching the trim assembly to the wheel, the ring being shown by itself apart from the assembly;

Fig. 4 is a fragmentary, elevational view of the attaching ring shown in Fig. 3; and Fig. 5 is a fragmentary cross-sectional view of the ring as shown in Fig. 4, taken along the section line 5—5 thereof;

Referring now to the drawing, a wheel trim retaining ring 10 according to a preferred embodiment of the invention is shown in connection with a wire wheel simulating wheel trim assembly 12 and a vehicle wheel 14. The trim assembly 12 illustrated in the drawings is generally similar to the trim assemblies shown in Patents Nos. 2,749,185 and 2,749,186, issued to E. L. Wood, June 5, 1956, and these patents may be referred to for further details of the trim assembly construction. It will be appreciated, of course, that the retaining ring 10 may also be used with wheel trims of other construction and of other types.

The wheel 14 shown is of a conventional type, and includes a load bearing body portion 16, to which a rim 18 is rigidly and permanently attached for supporting a tire 19. The body portion 16 includes a radially outer convex flange 20, which is curved generally axially inwardly to support the rim 18. A plurality of protuberances, or bumps 22 are struck radially outwardly from the body portion 16 immediately adjacent to the axially outer end of the flange 20 for retaining a hub cap 24. These bumps 22 are usually three in number, spaced at 120° intervals around the flange 20, and the hub cap 24 is provided with a peripheral bead 26 which is snapped over the bumps 22 for retaining the hub cap firmly on the wheel, the outer edges of the bumps 22 being disposed on a circle of somewhat greater diameter than the inner diameter of the bead 26. When the hub cap 24 is seated on the wheel, the bead 26 rests tightly wedged between the bumps 22 and the adjacent surface of the flange 20.

The retaining ring 10 according to the present invention is made of relatively thin sheet metal such as steel, and includes a radially inwardly extending flange 28, the inner diameter of which is approximately equal to the diameter of the axially outer end of the flange 20 so that the ring 10 fits snugly upon the wheel behind the bumps 22. The ring 10, being of relatively thin material is easily snapped over the bumps 22 and seated against the body flange 20. The radial flange 28 of the retaining ring is wedged tightly against the body flange 20 by the hub cap bead 26 when the hub cap is placed in position over the ring 10. In some cases it may be desirable to strike portions 30 of the wheel flange 20 immediately beneath the bumps 22 outwardly to provide an accurately located seat 32 for the retaining ring flange 28.

The trim assembly 12 illustrated in the drawing includes inner and outer annular portions 34 and 36 connected together by generally radially extending wires 38 as described in the hereinabove identified patents. The inner annular member 24 is shown as having an open center to expose the central portion 40 of the hub cap 24, which may be ornamented as desired. At their radially outer ends, the wires 38 are bent axially inwardly and then again radially outwardly, forming curved portions 42, the radially outer aspects of which constitute an annular recess to receive and retainingly engage the inner edge 44 of the outer annular member 36. The retaining ring 10 includes an axial flange 46 integrally formed with the radial flange 28 and shaped to receive the curved portions 42 of the wires, fitting against the convex, radially inner sides thereof. This axial flange 46 has two annular, raised portions, or humps 48 and 50, respectively, the axially outer one 50 of these portions being shorter in radial extent than the axially inner one 48. When the trim assembly 12 is placed on the retaining ring 10, the curved portions 42 of the wires snap over the outer hump 50 and slide into abutting engagement with the axially inner hump 48, being firmly held under their own spring tension between the two humps 48 and 50. The axially outer tip 52 of the axial flange 46 is turned inwardly toward the hub cap 10 to provide a smooth annular corner (not separately designated) for camming the wire portions 42 outwardly during application of the trim assembly upon the ring 10.

The wedging action of the hub cap against the radial flange 28 is generally fully adequate to hold the retaining ring 10 against indexing, that is, against rotating relative to the wheel 14 about the wheel axis. Indexing of the trim assembly 12 on the ring 10 is also to be avoided. The ring 10 is preferably made of relatively thin sheet steel or some other relatively non-plastic metal, such as bronze, that is not easily deformable in response to the spring pressure of the wires 38 of the trim assembly. The wires 38 do not, therefore, indent the ring 10 as they do the relatively soft annular trim members 34 and 36, and it has been found that the trim assembly 12 tends to index upon the retaining ring 10 during operation under certain service conditions. To prevent this, an anti-indexing tab 54 is fixed as by welding to the retaining ring 10 and positioned to extend axially across the outer periphery thereof between a pair of the wires 38. This anti-indexing, bridge-like tab 54 extends generally axially in a substantially straight line across the two humps 48 and 50 of the retaining ring 10, and is bent radially inwardly at both its ends and rigidly secured as by welding to both axial faces of the ring 10. The ring 10 may be made of flat sheet metal first formed to the desired cross-sectional contour, then rolled into ring form, and its ends rigidly secured together. In this case, the anti-indexing tab 54 may also serve as a welding tab to hold the two ends of the ring 10 together, and may be conveniently spot-welded in place, as shown, for example, in Fig. 5.

In assembly, the retaining ring 10 is first placed upon the wheel body 16, the radial flange 28 being relatively easily deflectable so that it readily passes over the bumps 22. The hub cap 24 is then snapped into place, fitting within the ring 10 and pressing against the radial flange 28 to bind the ring 10 tightly against the wheel body portion 16. The trim assembly 12 is then snapped over the outer hump 50 of the retaining ring to complete the assembly. Conveniently, the anti-indexing tab 54 is aligned with the tire valve stem 60 when the retaining ring 10 is first applied to the wheel, and the trim assembly 12 is arranged in manufacture so that the tire valve stem aperture 62 in the outer annular portion 36 is aligned with a tab receiving space 64 between a pair of the wires 38. In this way, the assembly may always be mounted upon the wheel with the valve stem aperture 62 always aligned properly with the valve stem 60.

The entire trim assembly 12 together with the retaining ring 10 may be readily removed from the wheel in two steps. First, a pry-off force is exerted between the wires 38 and the axially outer flange 52 of the retaining ring 10 to remove the trim assembly 12 from the retaining ring 10. Thereafter, the retaining ring 10 may be removed together with the hub cap 24 by a pry-off force applied against the axially inner surface of the ring 10, the total force required for this second step being approximately the same as that normally required to remove the hub cap 24 alone.

The retaining, or attaching ring 10 according to the invention, holds the trim assembly 12 securely on the wheel during all operating conditions, yet at the same time permits the trim assembly 12 to be readily removed for service purposes. It supports the trim assembly 12 in a "floating" position, axially spaced from the wheel to minimize the generation of squeaks and rattles and to prevent trapping of water or debris between the trim assembly and the wheel. This floating type retention permits the trim assembly 12 and the wheel 14 to flex independently of each other, thus minimizing the development of strains that might otherwise tend to dislodge the trim assembly 12 from the wheel. Additionally, full use is made of the hub cap 24 normally supplied as standard equipment to the retail purchaser of the automobile. The hub cap 24 is not discarded, but serves as an ornamental part of the assembly, providing a reflective background for the wires 38, and a decorative center piece, besides functioning to retain the trim assembly.

What is claimed is:

1. In a wheel assembly including an automobile wheel having a body portion provided with a generally radially and axially outwardly facing flange, a series of bumps extending radially outwardly at the axially outer end of said flange for snap spring retention of a hub cap, a hub cap having a peripheral bead seated between said bumps and said flange, and a trim assembly supported on the face of said wheel, the improvement comprising an annular trim retaining member including a radial flange seated behind the hub cap bead and firmly wedged thereby against said flange, said member also including an axially outwardly projecting flange shaped for snap spring engagement by the trim assembly for securely mounting the trim assembly and supporting it on the face of said wheel.

2. A wheel assembly comprising an automobile wheel having a body portion provided with a generally radially and axially outwardly facing flange, a series of bumps extending radially outwardly at the axially outer end of said flange for snap spring retention of a hub cap, a hub cap having a peripheral bead seated between said bumps and said flange, a trim assembly supported on the face of said wheel, an annular trim retaining member including a radial flange seated behind the hub cap bead and firmly wedged thereby against said flange, said member also including an axially outwardly projecting flange having two axially spaced radially outwardly projecting annular portions and an annular groove disposed between said portions, said trim assembly including radially inwardly projecting portions projecting into said groove and resiliently resting against said outwardly projecting flange portions.

3. An automobile wheel and trim assembly comprising an automobile wheel including a load-bearing body portion having a generally radially and axially outwardly facing flange, a plurality of angularly spaced bumps projecting radially outwardly at the axially outer end of said flange, a hub cap, a terminal bead formed integrally with said hub cap and wedgingly seated between said bumps and said flange, a trim retaining ring having a radial flange wedged between said bead and said flange, said trim retaining ring also including an axially extending flange integral with said radial flange and having a pair of axially spaced annular humps, and an ornamental trim assembly having radially extending snap spring portions seated between and resiliently resting on both of said humps, said trim assembly being supported solely by said axial ring flange in floating spaced relationship to said wheel.

4. A wheel trim assembly for attachment to the face of an automobile wheel of the type having a central load-bearing body portion including a generally radially and axially outwardly facing flange and a plurality of angularly spaced bumps extending radially outwardly at the axially outer end of the flange for snap spring retention of a hub cap, said trim assembly comprising a plurality of angularly spaced generally radially extending wire elements, outer end portions of said elements being turned axially and radially inwardly, and a sheet metal attachment ring having a radial flange proportioned to fit relatively easily over the wheel bumps and to be wedged against the body flange by a hub cap retained thereon by the bumps, said ring also including an axially extending flange integrally joined to said radial flange and having a pair of axially spaced annular humps for snap spring engagement by the inwardly turned outer end portions of said wire elements, a bridging member rigidly secured to said ring and extending along a substantially straight path between the crests of said humps, said bridging member being proportioned to fit between a pair of said wire elements to act as a stop for restraining said trim assembly against rotation about the wheel axis relative to said ring.

References Cited in the file of this patent

UNITED STATES PATENTS 2,493,767    Lyon _____ Jan. 10, 1950